United States Patent
Kocin (10) Patent No.: US 6,865,690 B2
(45) Date of Patent: Mar. 8, 2005

(54) VOLTAGE CONDITIONER WITH EMBEDDED BATTERY BACKUP

(75) Inventor: Michael J. Kocin, Poway, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 506 days.

(21) Appl. No.: 09/886,909

(22) Filed: Jun. 21, 2001

(65) Prior Publication Data

US 2002/0199131 A1 Dec. 26, 2002

(51) Int. Cl.[7] ................................................ G06F 11/30
(52) U.S. Cl. .......................... 714/14; 714/22; 713/340; 323/276; 307/66
(58) Field of Search ..................... 714/14, 22; 713/340; 323/276, 285; 307/66

(56) References Cited

U.S. PATENT DOCUMENTS

| 4,122,359 A | * | 10/1978 | Breikss ........................ 307/66 |
| 4,528,459 A | * | 7/1985 | Wiegel ........................ 307/66 |
| 4,694,194 A | * | 9/1987 | Hansel et al. ................. 307/66 |
| 5,289,046 A | * | 2/1994 | Gregorich et al. ............ 307/66 |
| 5,481,730 A | * | 1/1996 | Brown et al. ................. 307/66 |
| 6,275,946 B1 | * | 8/2001 | Meir ........................... 714/14 |
| 6,445,088 B1 | * | 9/2002 | Spitaels et al. ............... 307/66 |
| 6,597,074 B2 | * | 7/2003 | Tsujikado et al. ............ 307/66 |
| 2003/0028687 A1 | * | 2/2003 | Goossen et al. ............... 710/1 |

* cited by examiner

Primary Examiner—Robert Beausoliel
Assistant Examiner—Joseph D Manoskey
(74) Attorney, Agent, or Firm—Ronald M. Goldman (57) ABSTRACT

A power module for a CNI avionics system includes a rechargeable back-up battery (17) and a battery charger (9) in a back-up battery channel, a power conversion unit (11, 25, 27 and 29) in a power conditioning channel, and a semiconductor switch (23) for selectively coupling either the output of the power conditioning channel unit or the back-up battery channel through to the module output (24) and the electronics of external LRM's of the cryptographic section of the CNI avionics system, and a microcontroller (14) for controlling voltages and spurious signal emanations. Sensors (51, 52, 54 & 55) provide information to the microcontroller. The microcontroller senses the state of prime power, current draw on the cryptographic devices and adjusts power output between the battery and power supply in real time.

7 Claims, 6 Drawing Sheets

VOLTAGE CONDITIONER WITH EMBEDDED BATTERY BACKUP

BACKGROUND OF THE INVENTION

This invention relates to avionics power supplies, and, more particularly, to a dual function power conversion module for isolating, converting and regulating voltage supplied by the prime power source of the aircraft to the DC levels necessary to power avionics cryptographic processors and for providing battery back-up to support memory retention in the cryptographic device when prime power is lost or removed.

Future combined military communication, navigation and Identification ("CNI") Avionics systems will include secure processing to ensure that vital communications and data transmission are secure. Security requires that secure processing devices, such as cryptographic devices, use isolated power supplies to electrically isolate the electronic circuits of the device from other electronics circuits of the CNI system. The electrical isolation prevents sensitive data (in unencrypted form) from being coupled unintentionally to and transmitted by other sections of the avionics system through which the sensitive data could be intercepted by electronic eavesdroppers.

The encryption devices of the CNI avionics system make use of special data encryption algorithms, including encryption "keys". When entered, the encryption algorithms are stored in semiconductor memory associated with the secure processor device, avoiding the necessity to re-enter the key each time encryption is used. To preserve the encryption algorithms, the foregoing semiconductor memory must be continuously supplied with DC power. The requirement for continuous power requires a source of "keep alive" power to the system, back-up power that ensures that the memory receives power even when prime power to the CNI system, the main power generator of the aircraft, fails or is shut down.

As example, the prime or main power of the aircraft is typically extinguished when the aircraft engine is shut down while the aircraft is parked on the tarmac for refueling and/or other maintenance. CNI systems must therefore support an isolated power source, provide backup power for the memory of the secure processor when prime power is not available to preserve the encryption keys and permit periodic maintenance to be performed, including replacement of the back-up battery.

Generally speaking, power conversion and battery back up systems of one sort or another are known. Ostensibly such known systems should be available to serve the general functions described in the foregoing paragraphs. However, application in aircraft systems imposes special constraints. Hardware of the avionics system is designed to minimize weight and space requirements and maintenance. To ease the maintenance procedure, avionics systems preferably employ the Line Replaceable Module ("LRM") concept of product packaging. In application of the foregoing concept functional portions of the CNI avionics hardware are packaged in individual modules that "plug-in" to a backplane type interconnection circuit. That backplane electrically unites the individual modules into an integrated system. With the foregoing, replacement of individual modules may be accomplished easily by unplugging the respective module and plugging in a substitute. Thus, the "downtime" of the aircraft for maintenance is kept to a minimum.

One design approach, thus, is to include a back up battery for the earlier described purpose and a power supply that does not emit spurious frequencies (e.g. a non-spurious frequency emitting power supply), sometimes referred to as a TEMPEST power supply, in individual LRMs. For such a design, two separate LRMs are required to provide the functions of battery backup and the non-spurious frequency emitting power supply. Additional interconnection wiring between the foregoing LRMs and other LRMs of the avionics system may be accomplished in great part through the backplane. In such a system design prior to the present invention, the back-up battery alone required about 90 cubic inches of space, was three and one-half pounds in weight and, due to the limited life span of two to three years available with existing batteries, six thousand dollars in recurring maintenance costs. The power converter required about 23 cubic inches and adds another one and six-tenths pounds in weight.

As an advantage the present invention accomplishes the same function using a single LRM, thereby reducing both the weight and volume of the components of the avionics system. As a further advantage, the consolidation of both the described functions within a single LRM permits installation within an electrically isolated section of the avionics rack (backplane). That isolated section totally isolates the power, return and signal lines within the secure processing section of the avionics system from the other electronic circuits of the CNI system.

Isolation of spurious frequency emissions as might propagate into or through the power supply for the avionics system has been accomplished through inclusion of passive RF filters and through DC isolation of the component parts of the avionics system. Although to date such methods have been acceptable, some RF leakage was possible. As an advantage, the present invention not only incorporates passive RF filters, but takes a proactive approach to suppressing such emanations.

Accordingly, an object of the invention is to provide a power system for a CNI avionics system that is small in size and low in weight.

An additional object of the invention is reduce the weight and size requirements of the power supply and battery back up circuits and enhance the electrical isolation of those circuits in a CNI avionics system.

A further object of the invention is to actively prevent propagation of spurious RF frequencies through the power system for an avionics system and enhance isolation of the power system.

A still further object of the invention is to integrate an isolated power conversion system, a battery, and a battery charger driven by the power conversion system within a single housing or LRM.

And a final object of the invention is to increase the reliability of and reduce the cost of maintenance of CNI avionics systems.

SUMMARY OF THE INVENTION

In accordance with the foregoing objects and advantages, a single Line Replaceable Module of the avionics system, the power module, houses a battery charger and rechargeable back-up battery, and a power conversion unit. Each of the battery charger unit and power conversion unit operate in parallel to convert the voltage of the main aircraft supply to that respectively required to trickle charge the battery and supply the electronics of external LRM's of the secure processing section of the CNI avionics system. The module further includes a semiconductor switching device for selectively coupling either the power output of the power conversion unit or power derived from the battery to the external LRM of the secure processing section of the CNI avionics system. The LRM includes a controller, suitably a microcontroller, for monitoring and controlling the power into and out of the foregoing circuits.

The microcontroller senses the state of prime power and current draw and voltage on the active circuits and adjusts power output in real time to suppress propagation of spurious frequencies while maintaining correct DC levels for proper circuit operation. Voltage and current sensors are incorporated to inform the microcontroller of average voltage and current at the inputs and outputs of the inputs and outputs of both the battery back up system and the power conversion unit. The controller, when appropriate, adjusts the various voltage and current levels.

As an additional feature to the invention an interference filter is included to couple the main supply to both the power conversion unit and battery charger unit and inhibit propagation of spurious emanations into or out of the LRM.

In an additional aspect to the invention the battery, battery charger, power conversion unit and controller are positioned in a single Line Replaceable Module, further reducing the risk of coupling sensitive data into transmit paths within the avionics system.

The foregoing and additional objects and advantages of the invention, together with the structure characteristic thereof, which was only briefly summarized in the foregoing passages, becomes more apparent to those skilled in the art upon reading the detailed description of a preferred embodiment of the invention which follows in this specification, taken together with the illustrations thereof presented in the accompanying drawings.

DESCRIPTION OF THE PREFERRED EMBODIMENTS

Figure 1:
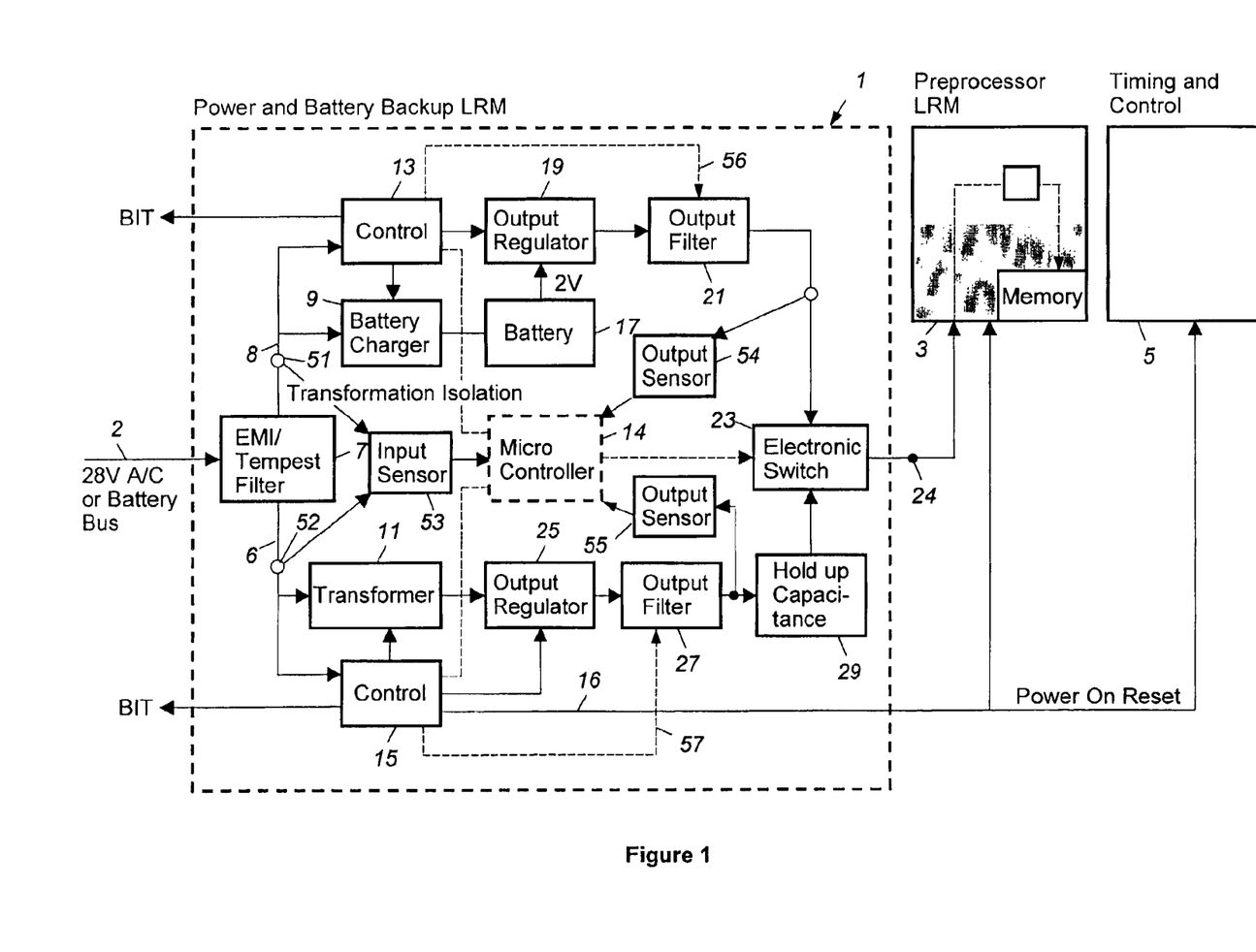
FIG. 1 is a block diagram of an embodiment of the invention.

Reference is made to the block diagram of FIG. 1 illustrating the new power conversion and battery back up system 1, represented in a single plug-in module ("LRM") as outlined in dash lines. To aid in understanding the operation of the invention in connection with the CNI avionics system, the relationship of LRM 1 to other components of an existing CNI avionics system is also illustrated. Such external avionics system includes, an external CNI preprocessor LRM 3, which contains the memory for the secure processing algorithms, and a timing and control LRM 5, which receives power to enable the avionics system to restore from a standby mode (e.g. reset) to full operation. The details of the foregoing LRMs 3 and 5 and the operation thereof are known, are not necessary to an understanding of the invention and need not be described in detail. Discussion of the latter LRMs is, hence, limited to the general discussion thereof, presented later herein.

The main generator of the aircraft 2 connects to the prime power input of an electromagnetic interference ("EMI") filter, referred to as the TEMPEST filter 7. "TEMPEST" is the acronym for Telecommunications Electronics Material Protected from Emanating Spurious Transmissions. Such EMI filters are old and known in the avionics electronics industry.

Filter 7 contains two outputs and divides into two paths 6 and 8. One of those electrical paths 6, which may be referred to as the power conditioning circuit or channel, connects to the primary winding of a transformer 11 and to the control unit 15 associated with that transformer, later herein more fully described. The second path 8, which may be referred to as the battery backup circuit or channel extends the filtered power from the main source to a battery charger 9 and to an associated control unit 13, associated with controlling the operation of the battery charger, as hereinafter described.

The output of battery charger 9 is coupled to a rechargeable battery 17 to supply the battery with a "trickle" charge. Battery 17 is intended to be fully charged at a lower voltage than required by the CNI avionics system for full operation, as example, two Volts, whereas the system requires a much higher voltage, as example, five volts. Battery 17 also connects to an input of output regulator 19. That regulator also boosts the nominal voltage level at the regulator output from the voltage supplied by the battery. In this embodiment the boost is to about four-and-one-half volts. The latter voltage is sufficiently high to power a semiconductor memory of the CNI avionics system with "keep-alive" power, but is insufficient to permit full avionics system operation. As an example, the battery may supply 2V, the regulator output supplies about 4-½ volts while the avionics system requires 5.0 Volts for full operation. It should be recognized, however, that the system can accommodate any low voltage DC input to memory. The output of regulator 19 connects through an electronically adjustable output filter 21 to one input of electronic switch 23, later herein discussed.

Control 13 includes a control output connected to a control input of battery charger 9, and another control output connected to output regulator 19. Internally the control unit also contains a fault/Bit sensor, not illustrated, that provides a built-in test ("BIT") output. Fault/bit sensors and BIT information are conventional features of earlier avionics systems. The BIT output provides "health" status information to another LRM of the CNI avionics system, not illustrated, that functions to monitor system performance, log fault conditions, and report fault conditions to the pilot of the aircraft and/or maintenance personnel. The latter apparatus is included in a typical avionics system, but is not further described, as such apparatus does not form part of the present invention.

Output filter 21 is an electronically controllable filter of known construction. The filter characteristics may be controlled by control voltages applied to a control input, not illustrated. Control unit 13 includes an output that connects to the control input of filter 21, as indicated by line 56, the purpose of which is described later herein in the discussion of the operation of the power supply. The output of filter 21, which serves as the output of the battery back up channel to the power module, connects to an input of electronic switch 23. The electronic switch acts as a gatekeeper in the present system, allowing only one of two inputs at a time to pass through to LRM 3, either that inputted from filter 21 or that inputted from the power conditioning section originating at path 6, next described.

Coupled to the output of filter 7 via lead 6, the power that is input into the primary of transformer 11 is transformed and the transformed power is output from the transformer secondary to an output regulator 25. In addition to providing voltage regulation, regulator 25 converts the inputted voltage to a higher voltage, and is capable of being controlled by digital control signals, such as may be supplied by a microprocessor. The MAXIM Company markets regulators of the foregoing type. The output of regulator 25 is coupled into an output filter 27, which filters the DC voltage. The output of that filter is coupled to a "hold-up" capacitance 29, and to a second input to electronic switch 23. Output filter 27, like filter 21, is an electronically controllable filter of known construction. Control unit 15 includes an output that connects to the control input of filter 27, as indicated by line 57. The filter serves as an output of the power conditioning branch or channel. The resistance characteristics of filter 27 may be controlled by control voltages applied to a control input, not illustrated, by control unit 15, the purpose of which is described later herein in the discussion of the operation of the power supply.

In addition to control of transformer 11 and filter 27, control unit 15 also controls output regulator 25 and provides a "power on reset" signal, when appropriate, over a separate bus 16 to LRMs 3 and 5 and also supplies another "BIT" information, earlier described, to the external monitoring stations. The output of electronic switch 23 is applied to the secure processing circuits and the memory input of LRM 3, supplying, as example, 5.0V when normal power is being supplied to LRM 1 and 4.5V when the LRM 1 is supplying battery back up power.

A microcontroller 14 provides the intelligence to the system. The microcontroller contains an output that connects to electronic switch 23 to enable the microcontroller to switch the state of the electronic switch from the default condition in which the battery back up channel is coupled through to the module output 24 to the normal power condition in which the power conditioning channel is coupled through to that output. The microcontroller also contains another output connected to control unit 13 which controls regulator 19 and filter 21, and still another output connected to control unit 15 that controls transformer 11 and output filter 27. The microcontroller receives DC operating voltage via an internal printed circuit board ("PCB") connection that is separate from the output voltage to the cryptographic device.

Power sensors 51 and 52 are provided to monitor the respective power flowing into each of the two circuit paths at 6 and 8, that is, monitor both the voltage and current, individually, at the respective outputs of filter 7. The outputs of those sensors are coupled through an input sensor unit 53, which in turn connects to respective inputs of microcontroller 14. A third power sensor 54, referred to as an emanations sensor, monitors the voltage and current output of output filter 21, and couples the information to another input of the microcontroller. A fourth power sensor 55, also referred to as an emanations sensor, monitors the voltage and current output at the output of filter 27, and couples the information to still another input of microcontroller 14.

In normal operation of the CNI avionics system, the generator of the aircraft (in which the embodiment of the invention is installed) supplies prime power to input 2 of the LRM power module at TEMPEST filter 7. Typically that power is supplied at a voltage of 28 volts AC. The filter is an active filter of known design, which contains, among other things, a transformer, inductors, capacitors and shunt diodes. Filter 7 is designed to prevent electromagnetic energy from entering or exiting the system over the electrical leads and thereby serves to provide some electrical isolation of the power supply unit. The filtered AC voltage is applied via lead 8 to battery charger 9 and via lead 6 to the primary winding of electrical transformer 11 of the power conditioning circuit.

In normal operation, the power conditioning circuit (entered through path 8) produces the output power for LRMs 3 and 5, supplying full power, while the backup battery circuit, via path 6 is simply supplying trickle charge current to battery 17. Controllable output regulator 25 converts the primary voltage from transformer 11 from 2V to the higher 5V secondary DC voltage needed by the external LRMs and applies the DC to adjustable output filter 27. It should be recognized that other applications could use other voltages (either step up or step down). Controllable regulators of the foregoing type are commercially available, as example, from the MAXIM Company. In turn filter 27 smoothes the DC voltage and suppresses AC harmonics. The DC output from filter 27 initially supplies charging current to hold up capacitor 29, which receives and holds a full charge as long as the foregoing DC output continues.

As later described, capacitor 29 serves as a temporary source of DC power to electronic switch 23 and to a power input of microcontroller 14, enabling the microcontroller to function for a short interval (as example, fifty to one-hundred microseconds) following the failure of the prime power to input 2 or the power conditioning channel fails for other reasons. Electronic switch 23 remains in the normal state for the short interval as the output voltage from filter 27 and hold-up capacitor 29 falls off.

Electronic switch 23, suitably a power hybrid construction, is supplied with DC operating voltage, bias, via a bleed circuit, not illustrated, from battery 17 or output regulator 19 in the battery back up channel. In the default condition (i.e. when the prime power at input 2 is off or fails), the electronic switch couples output power from the battery back up circuit via filter 21 through to the module output 24. When prime power is present at input 2 and the power conditioning channel functions to supply power to at least hold up capacitance 29 at the output of the foregoing channel, electronic switch 23 is biased by an output from microcontroller 14 to pass the voltage (and current) from output filter 27 and hold up capacitor 29 in this power conditioning channel of the unit to the output 24 of LRM 1. The latter power is applied from that output to the power inputs of the preprocessor LRM 3. If the electronic switch is in the default condition and prime power is restored, the microcontroller will apply the command voltage to the electronic switch to cause electronic switch 23 to switch from the default condition to the condition in which it conducts the power from output filter 27 to output 24 of the unit.

In a practical embodiment a "2×1" standard RF switch is preferred as the electronic switch. The RF switch can be set in a default state and is diode protected and inhibits passage of leakage currents. Other alternatives to the switch are possible. As example, it is recognized that each of the foregoing channels may be connected by separate diodes to a common juncture that would serve as an output to the unit. Since the voltage from the power conditioning channel when active is higher than that from the battery back up channel, the diode in the latter channel is back biased, and cannot conduct current. Thus current would only be supplied to the output by the power conditioning channel. Conversely, when the power conditioning channel is inactive, power would be supplied from the battery back up channel through the respective diode in the channel to the output of the unit. However, the diode in the power conditioning channel is back biased in that event, and reverse current from the battery back up channel is prevented from passing into the power conditioning channel. As is recognized, such a circuit eliminates the necessity for an electronic switch, and switching between channels occurs automatically. However, as those skilled in the art appreciate, due to the risk of diode failure, such a minimal circuit is less preferred than one which incorporates an electronic switch which employs electronics (and which may include diodes as additional circuit protection.

Concurrently with the foregoing circuit operation, electrical power supplied via path 8 to battery charger 9, which supplies power to charge the rechargeable battery 17, and to control unit 13. Once battery 17 is fully charged, the charger continues to provide a trickle-charge current to the battery, replacing the small amount of charge that dissipates through internal leakage resistance of the battery.

Battery 17 is connected to function as a power source. The output of the battery is connected to controlled output regulator 19. The output regulator in turn steps up the voltage in a DC-to-DC conversion, as example from two volts to four and one-half volts, and outputs the up-converted DC voltage to a second input to electronic switch 23, via controllable output filter 21. The latter filter functions to smooth the DC voltage and suppress harmonics.

During normal operation of the LRM, no current is drawn from the battery, output regulator 19, powered from the battery, continues to step up the voltage during this period, although, with minor exception, DC current should not flow. At this stage electronic switch 23 does not couple the output of filter 21 through to LRM 3. However, as later described, the circuit remains a possible path for propagation of spurious AC emanations. Battery 17 essentially remains on standby condition as an alternative or back-up power source.

When prime power is disabled and terminates the input at 2, microcontroller 14 continues to function for a short interval and senses the loss of input voltage at paths 8 and 6 by means of sensors 51 and 52, respectively. Even though the prime power is disabled, removing the principal source of operating power for microcontroller 14, the microcontroller continues to function for a short period, consuming a portion of the electrical charge stored in hold up capacitor 29. When the prime power is disabled, the power supply function and battery charging function within LRM 1 terminates. As prime power is disabled microcontroller 14 and control units 11 and 13 automatically power down over a short interval, as example, of about 50 milliseconds, when the charge in capacitor 29 is sufficiently depleted. When prime power is reapplied to the system, microcontroller 14 automatically powers up and regains control once the CNI system power-on reset (e.g. the stand-by signal) is released.

As hereafter described, the microprocessor senses the failure of the power conditioning channel and during the remaining interval in which the hold up capacitor supplies operating power sends the "BIT" information via control units 11 and 13 that the module is operating on back up power.

Electronic switch 23 remains in the existing conductivity state by the bias voltage supplied by the power conditioning channel that holds the switch in the normal state. Should that channel fail, the electronic switch is momentarily retained in the current state by the charge in hold-up capacitor 29, but only for a short interval as the charge stored in the capacitor dissipates. Once the charge in the hold up capacitor dissipates sufficiently, electronic switch 23 switches its state to the default current conducting condition. When the switchover occurs, electronic switch 23 terminates (e.g. opens) the current path from filter 27 and hold up capacitor 29 to module output 24 and closes the standby path from the output filter 21 in the battery back up channel to the module output. The foregoing change of state enables current to flow from battery 17, via output regulator 19 and filter 21 and through the switch to module output 24. The power supplied from the back up battery channel is at a lower voltage than was supplied through the power conditioning channel. That lower voltage is sufficient in level to maintain the semiconductor memory of the secure processing device in LRM 3 supplied with power, and the memory retains the information stored.

It should be noted that LRM 3 contains internal power control circuits that receives the higher voltage normally supplied by the module, and supplies that voltage to operate the various circuits for full operation. However for powering the internal memory, LRM 3 limits or cuts-down the foregoing voltage, as example by Zener diodes or the like, to a lower voltage, such as three volts, required by the memory. When module 1 instead supplies the lower voltage during the battery back up operation, the lower voltage is insufficient to operate the circuits that require the higher voltage, but the lower voltage is above the voltage required for the memory of LRM 3, and the voltage limiting circuits of LRM 3 also restricts or cuts-down the foregoing lower voltage to that required by the memory.

The regulating functions of the circuit earlier briefly described are next considered in greater detail. Controls units 13 and 15 are either included in the unit as sections of a programmed microcontroller or are separate units as is illustrated in the block formed with dash lines. The control units are digitally controlled by outputs from microcontroller 14.

During operation, hardware power sensors 51 and 52 passively monitor the respective input line voltage level and current draw and provides that information through input sense unit 53 to respective inputs or input of microcontroller 14. The microcontroller includes analog-to-digital converters, not illustrated, which respectively detect voltage and current levels, and converts those levels into corresponding digital words. From those digital words the software program being operated in the microcontroller calculates the existing performance conditions and determines whether any adjustments are necessary.

The operating program, the software, of the processor in the microcontroller evaluates almost instantaneously the foregoing parameters for fluctuations and emanations that do not meet the system requirements set by the designer of the system stored in the program. The monitored parameters may either exceed or fall below set design parameters. Should the monitored voltage and/or current fall outside the system requirements, the microcontroller temporarily stores the foregoing monitored readings, and the increment necessary to place the respective power within specification or change conditions toward that direction, selects a single or multiple filtering algorithm to apply to respective control units 13 and/or 15 to reduce emanations or variance to the specified levels. The software then compares monitored voltages and currents that immediately follow the application of the selected filtering algorithm with the monitored readings earlier stored.

If the incremental change does not exceed the stored increment earlier found necessary, then the program provides another filtering algorithm and repeats the foregoing procedure, temporarily storing the latest readings monitored in place of those readings earlier stored. The foregoing process represents a continuous software and hardware feedback loop that remains in operation as long as the power supply remains in the normal mode of operation in which microcontroller 14 receives operating power.

The output lines of filters 21 and 27 are also monitored for fluctuations and emanations in similar fashion to the input monitoring previously described. During operation, hardware power sensors 54 and 55 passively monitor the respective filter output line voltage level and current draw at the outputs of filter 27 and 21, respectively, and provides that information to respective inputs of microcontroller 14. Analog-to-digital converters included within the microprocessor detect voltage and current levels, and convert those levels into corresponding digital words. From those digital words the program being run in the microcontroller calculates the existing performance conditions and determines whether an adjustment is necessary.

The software program of the processor in the microcontroller almost instantaneously evaluates the foregoing parameters for fluctuations and emanations that do not meet the system requirements set by the designer of the system stored in the program. The monitored parameters may either exceed or fall below the set parameters. Should the monitored voltage and/or current fall outside the system requirements, the microcontroller temporarily stores the foregoing monitored readings, and the increment necessary to place the respective power within specification, selects a single or multiple filtering algorithm to apply to respective control units 13 and/or 15. In turn, the control units respectively adjust the filter characteristics of the associated controllable output filters 21 and 27 to reduce emanations or variance to the specified levels.

The software then compares monitored voltages and currents that immediately follow the application of the selected filtering algorithm with the monitored readings earlier stored. If the incremental change does not exceed the stored increment earlier found necessary, then the program provides another filtering algorithm and repeats the foregoing procedure, temporarily storing the latest readings monitored for those earlier stored. The foregoing process represents a continuous software and hardware feedback loop that remains operation as long as the power supply remains in the normal mode of operation in which microcontroller 14 receives operating power. The foregoing process also represents a continuous software and hardware feedback loop that remains operation as long as the power supply remains in the normal mode of operation in which microcontroller 14 receives operating power.

In the power-conditioning channel, path 6, the foregoing adjustment is made by control 15 adjusting output regulator 25. In the back-up battery channel, path 8, control unit 13 adjusts the output regulator 19 to make the adjustment. In continuously running the program, the microcontroller is able to determine the efficacy of the adjustment. The microcontroller is capable of adjusting each of the power control circuits independently and, if necessary, simultaneously. The foregoing control allows the power system to operate without any possible emanations detectable on the prime power or return (ground) lines or on the secondary power lines that feed into the secure processing circuits.

Additionally, the same sensors are provided to monitor the outputs of each part of the power supply for differential noise components (e.g. Noise vs frequency) and common mode noise (noise on RF common lines) and to monitor ground paths as well as signal power paths.

As an additional feature, the embodiment includes a built-in test procedure and fault reporting provided by the control software. With the input sensor data collected by the microprocessor, the software determines whether the voltage and current as monitored is greater than or less than the respective voltage and current levels set by the system designer. That is, the software checks to determine if there is an over voltage, under voltage, over current and/or under current condition by comparing each monitored value to a fixed standard.

Major fluctuations in voltage and current signals a fault condition in the LRM, while minor fluctuations may signal the need for additional filter algorithm adjustment in the control feedback loop earlier described. The values detected are stored as a fault monitoring code, and each parameter monitored is individually reported by the program as a "health status" for each parameter to a primary fault/health status computer, not illustrated, in the CNI system. Should the reported fault exceed a set of predetermined levels, a fault monitoring switch in the CNI system computer sends a set of shutdown commands to a power supply control switch, not illustrated. The foregoing initiates an orderly shutdown sequence that limits the risk of damage to the power supply hardware or the secure processing elements connected to the output line of the power supply.

Microcontrollers suitable for the foregoing application are available in the marketplace, as example, the MAX5003DC-DC controller of the Maxim Company and include appropriate instructions for programming the controller. The microprocessor is fast, preferably on the order of 500 MHz. As one appreciates, the programming is authored to handle the specific functions described herein. Alternatively devices like TMS-320 devices from Texas Instruments Company can be utilized to control and monitor the voltage regulator functions.

Figure 2:
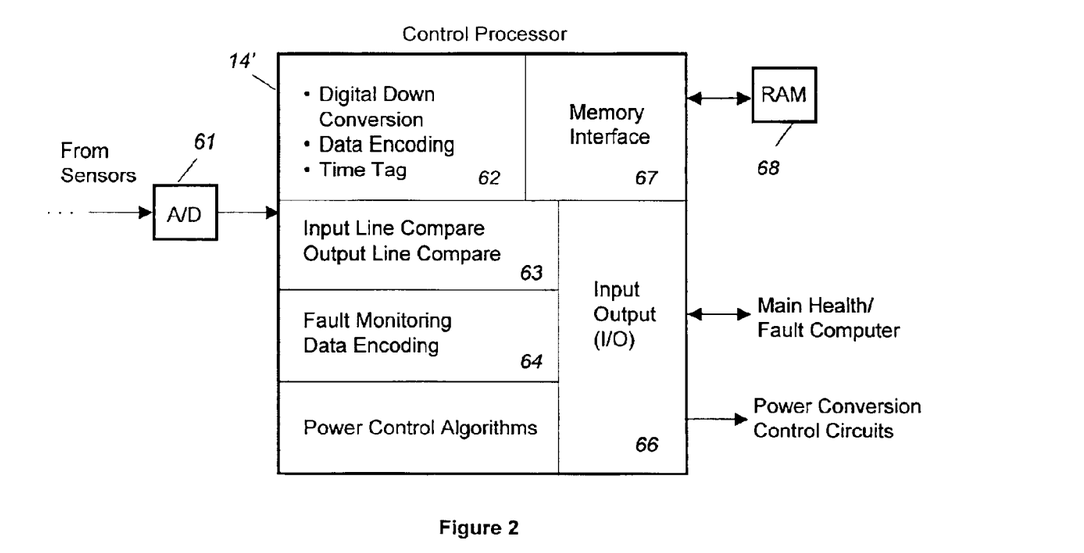
FIG. 2 is a layout of the processing partitioning and interfaces for the foregoing microprocessor.
Figure 3A:
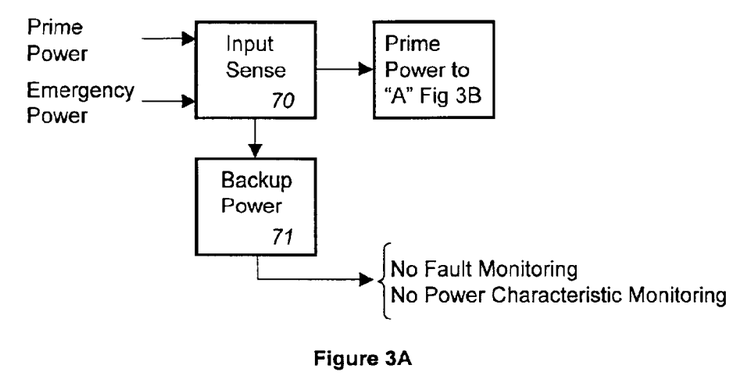
FIGS. 3A, 3B and 3C define functional operations for the software for the foregoing microprocessor.
Figure 3B:
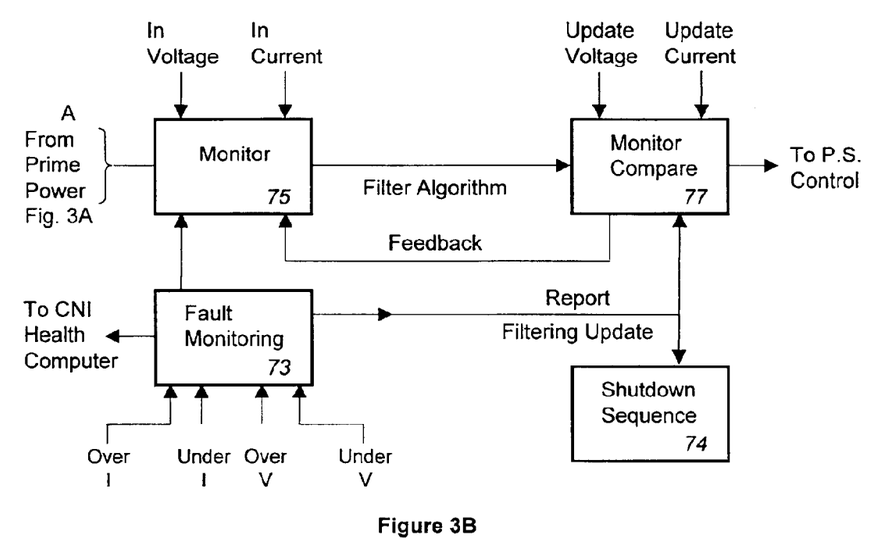
Figure 3C:
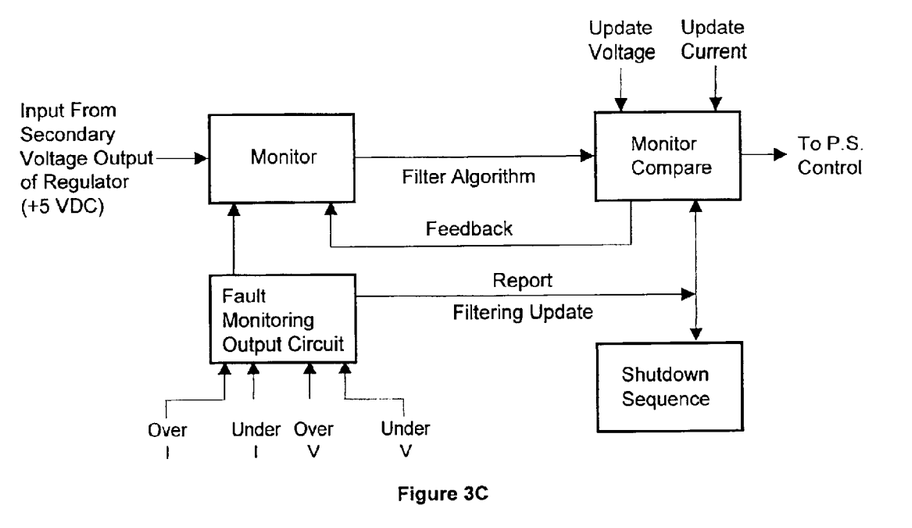
Figure 4:
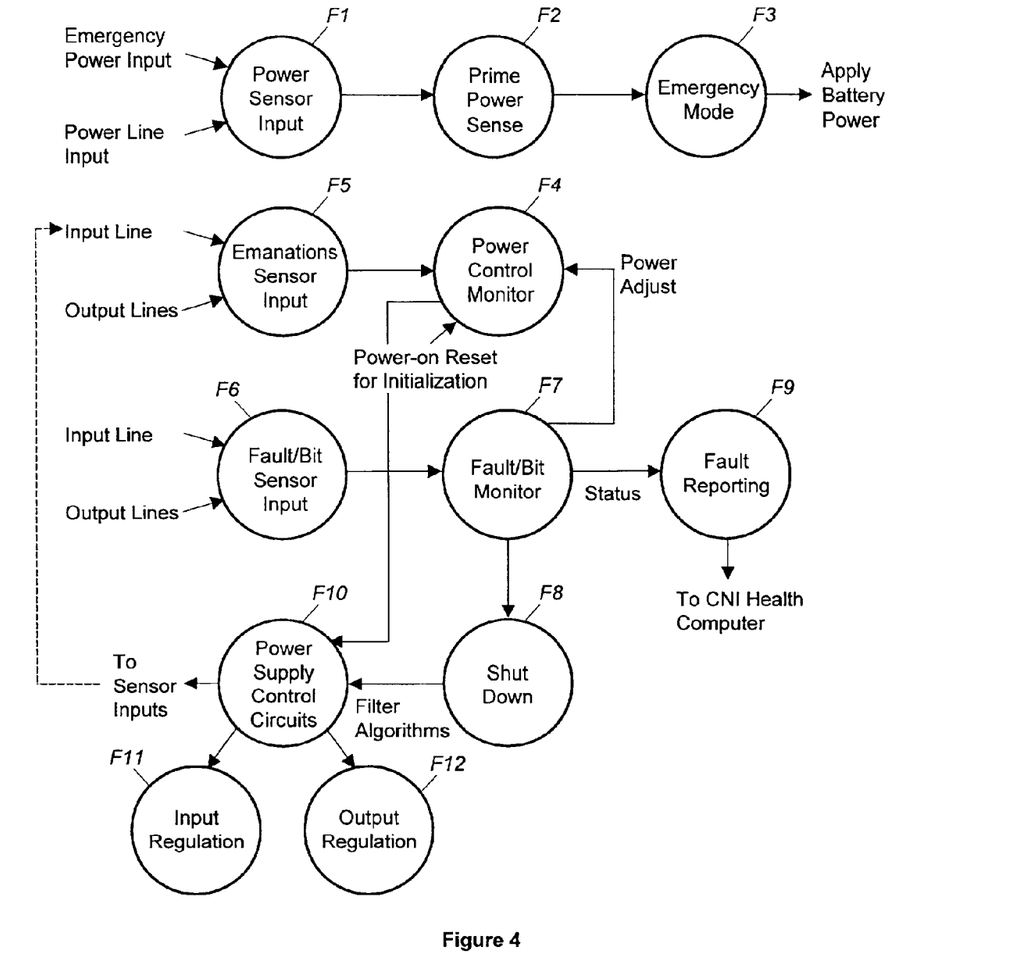
FIG. 4 is a bubble diagram of the software flow in the microprocessor.

The programs of the microprocessor and the functions served are defined by the software architecture; the processing partitioning and interface layout as illustrated in FIG. 2; the general ("high level") block diagrams of the functions to be performed, illustrated in FIGS. 3A, 3B and 3C; and a high level software data flow chart of FIG. 4. Together with the functional description previously given, the foregoing information enables an ordinary skilled software engineer to select appropriate coding details to provide a specific implementation of the program.

The software architecture for the microprocessor programs includes six principal components, one of which is the operating system of the processor of the microcontroller. The remaining five components are the boot up and initialization routines; command and control programs, such as mode determination (e.g. regular power or battery-back up power), input voltage adjustment, output voltage adjustment and sensor control; the power interface programs, such as those for controlling the prime power, the battery backup and abnormal power modes (e.g. system shut-down); emanations monitoring programs, such as the input line algorithms, output line algorithms and feed back loop adjustments; and the fault monitoring programs, such as the built-in test, health monitoring and reporting, and maintenance.

The processing partitioning and interfaces chart illustrated in FIG. 2 indicates the relationship of the control processor to the hardware. The control processor (e.g. microprocessor 14) contains six principal sections. The various sensors, referred to elsewhere, for sensing voltage, current, and the like, generally indicated in the figure, connect to a multi-channel analog to digital converter 61, which provides multiple digital outputs to corresponding sensor inputs of the control processor. The processor includes (block 62) a program to convert and format the digital data supplied at the various sensor inputs (i.e. digital down conversion) into the appropriate digital format that is understood by the particular microprocessor that is used. That program preferably also adds a time tag as a header to the formatted data, "stamping" the data with the time of receipt to an appropriate degree of accuracy, as example, to the millisecond. Preferably the converted data from all of the various inputs and a single time tag is combined into a single 32-bit or 64-bit word (e.g. data encoding).

A section of the processor (block 63) is reserved for the program that accomplishes comparison of the input lines from the prime power and the output lines reflecting the secondary power. The preferred procedure for implementing the comparison in software is elsewhere herein described. Another section (block 64) of the processor is reserved for the fault monitoring function and data encoding of the fault data that is reported to the external health monitor computer. This data is stored in non volatile memory for use of a later time. Fault monitoring data can also be used in real time. If the tolerances of the monitored signals exceed preset values the power supply will automatically proceed to shutdown. Another section (block 65) is reserved for algorithms used for power control, elsewhere herein described. An input-output ("I/O") section (block 66) interfaces with the power conversion control circuits and to the main health/fault computer. The memory interface ("I/F") (block 67) provides a data connection to internal and/or external non-volatile random access memory ("RAM") 68 associated with the control processor.

The logic flow is presented in FIGS. 3A, 3B and 3C. Referring to FIG. 3A, the processor must sense whether the prime power source is active (e.g. input sense 70). If so, the logic proceeds to apply electrical power to control monitor 75 (FIG. 3B). If not, the system must initiate back up power 71, which is the application of the battery back up shown in FIG. 1 as the system output. When the back up battery is supplying power, power characteristic monitoring and fault monitoring for the power supply system are unavailable.

Referring to FIG. 3B, when prime power is active, a monitoring function 75 is active. The input voltage and input current are monitored. The monitored voltages and currents must be compared 77 with corresponding voltages and currents and the same locations that precede in time the most recently monitored voltage and currents. If the comparison shows a departure, the controller will search the SW table in the micro processor to determine the appropriate digital filtering algorithm to apply to the power line.

Fault monitoring 73 is provided to check for over voltages and currents and under voltages and currents, and supply that information to an external "health" computer, a supervisory computer ("to P.S. control") external to the system, to initiate a shutdown sequence 74 if the over or under voltages and currents are too far out of tolerance, and to record the fault in non volatile memory so it can be retrieved at a latter time by maintenance personnel on the flight line or depot.

Referring to FIG. 3C, when prime power is active, and the output DC voltage is flowing to the cryptographic device(s), a monitoring function is active. The output voltage and output currents must be compared with corresponding voltages and currents and the same locations that precede in time the most recently monitored voltage and currents. If the comparison shows a departure, the controller will evaluate the filtering algorithms located in the SW table contained in the microprocessor. From this, the appropriate digital filter is then applied to the output power lines(s).

Fault monitoring is provided to check for over voltages and currents and under voltages and currents, and supply that information to the external health computer as described for the input monitor. If the values are too far out of tolerance, the power supply may be shutdown. All output line fault data is stored in the non volatile memory.

The software data flow is illustrated in the "bubble" chart of FIG. 4. The designations, such as emergency power input and power line input that are directed into a bubble, such as the bubble F1 labeled power sensor input, represent the formatted digital data as received from the hardware sensor and encoded and with the time stamp applied. From power sensor unit F1, the information is applied to the prime power sense F2, where the data is analyzed to determine whether the emergency mode F3 is to be implemented. If so, the monitoring function is terminated and battery power is to be supplied to the cryptographic memory as earlier described. The same data is applied to power control monitor F4. If the emergency mode is not to be implemented, the power control monitor evaluates the data.

The data from the sensors for the input line and output lines of the power unit form the data representing the emanations sensor inputs F5. The latter data is also input to the power control monitor F4. The input line and the output lines are also applied to the fault/bit sensor input F6. In turn the fault/bit sensor input is applied to the fault bit monitor F7. Should the fault bit monitor determine that the variance is well above a predetermined design level set by the designer, the fault bit monitor activates the shut down sequence F8 for the system. Otherwise the data from F7 is applied to power control monitor F4 and serves to specify a power adjustment function to the power control monitor. The data from the fault bit monitor is also available as status information to a fault reporting function F9, which reports to an external "state of health" monitoring computer of the avionics system, not illustrated and which does not form a part of the present invention. A power on reset command is also input to the power control monitor function F4 to initialize the system when first activated. With the various data of prime power levels and emanations levels, power control monitor provides filter algorithms for control of the power supply to the power supply control circuit F10. The respective data is used for input regulation F11, output regulation F12 as part of the primary feedback loop earlier described in the functional diagrams.

The power supply monitors both inputs and outputs to adjust emanations, functioning to keep the emanations as low as possible or at least below a predetermined level that the designer finds acceptable. The adjustments are accomplished essentially in real time. The power supply thereby enhances isolation between the power inputs and the output to the avionics system.

Figure 5:
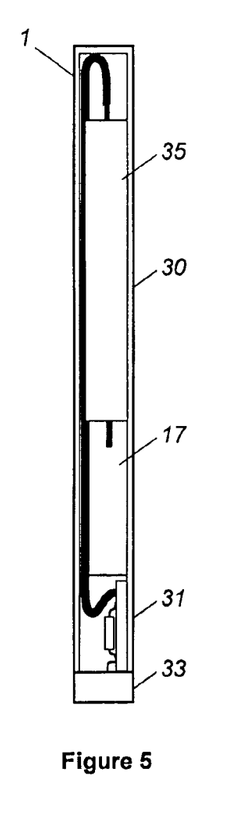
FIGS. 5 and 6 illustrate the packaging of the embodiment of FIG. 1 for inclusion within a CNI avionics system.
Figure 6:
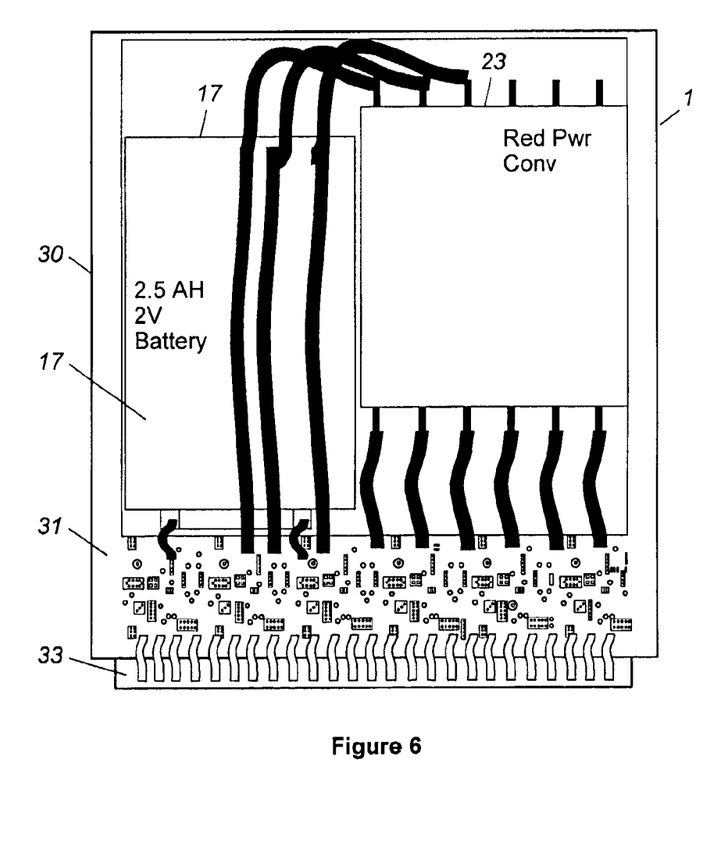

The LRM module 1 that houses the foregoing elements of power conditioner is a thin fiat elongate rectangular shaped container or housing 29, such as shown in FIGS. 5 and 6. As an example, LRM module 1 may be about six inches by six inches in height and width, and about six-tenths of an inch thick. However, LRM module 1 may have many other shapes in accordance with this invention. Primary transformer 11, output regulator 25, output filter 27 and hold-up capacitance 29, illustrated in FIG. 1, are packaged together into a single assembly 35, referred to as the "Red Power Converter" that fits inside the LRM module as illustrated.

Battery 17 fits alongside the foregoing assembly 35. A single multi-layer printed circuit card 31, to which the remaining electronic components of the LRM, earlier identified, are mounted, is located at the bottom end of the housing. The card is electrically wired by appropriate leads to the lead ends of a multi-contact or pin connector 33, which is located at the bottom end and closes that end of the housing.

The printed circuit card serves as the input-output interface to the mother board, not illustrated, of the CNI system, may contain test interfaces, not illustrated, the EMI filter and battery charger circuit. The input-output connector provides interface to the prime power source, the secondary power distribution interface, and allows control and built-in test signals to be exchanged within the overall CNI system controller, not illustrated, that is located on a separate LRM. The inclusion of all of the foregoing functions within a single LRM significantly reduces the risk of coupling sensitive data unintentionally to transmission paths within the CNI system.

Connector 33 is a standard connector that mounts to a mating connector of the back panel system within the CNI system. Battery 17 is wired to the appropriate contacts on circuit board 31, such as was represented in the block diagram of FIG. 1.

In specific aspect of a practical embodiment of the invention, battery 17 is a lead-acid battery, suitably with a 2.5 amp-hour capacity, and is of a relatively flat geometry. Batteries of different chemistry capacity and geometry may be substituted as desired, such as Nickel-Cadmium batteries, Nickel-Hydrite batteries, Lithium batteries and/or Lithium Ion batteries, without departing from the scope of the invention. As new battery chemistries are developed in the future, those type batteries may also be substituted for the lead-acid battery. With the 2.5 amp-hour lead-acid battery and, depending on environmental conditions and the number of secure processing circuits in the system, it is expected that the backup battery will provide between ten to thirty days of trickle charge current, without the need for a recharge.

The LRM housing 30 preferably opens from a side, and incorporates the dual enclosed module framework, such as illustrated in U.S. Pat. No. 4,689,721. Typically, the printed circuit board, as stuffed with the electronic components is wired to the connector 33. Then battery 17 and Red Power converter 35 are wired to the printed circuit card. Such wiring may be accomplished, as example, with small diameter cables and/or flex lines. The foregoing components are then mounted to one side wall of the housing, with the connector located at the bottom end. The open side wall is then closed and fastened by screws, not illustrated. The connector closes the end of the housing and is ready to be plugged into the avionics rack.

The foregoing LRM construction permits the cover to the housing to be removed and the hybrid and/or the battery to be replaced. The battery may be replaced without replacing the remaining electronics, a significant cost advantage over existing designs. No repair to the power supply section of the design is necessitated by the battery replacement. As a result acceptance testing of the repaired LRM is simplified and functional and environmental certification remains uncompromised.

The new power supply system provides a repairable/replaceable battery cell, simplifies the EMI design by reducing critical power interfaces to a Line Replaceable Module, and incorporates more readily available commercial-industrial components, reducing the risk of redesign due to "out of production" components.

For purposes of this description and the claims that follow in this specification, the foregoing circuit may be referred to in more general terms. The first channel, containing transformer 11, regulator 25 and output filter 27 and hold up capacitor 29, may be referred to as the power conditioning channel. The output of filter 27 (and the capacitance 29) serves as the output of that power conditioning channel. The second channel, containing the battery charger 9 and battery 17, regulator 19 and output filter 21, may be referred to as the battery back up channel. The output of filter 21 serves as the output of the battery back up channel. Electronic switch 23 may be referred to as a selection gate and the output of the electronic switch 24 serves as the output to the power source unit of the invention, LRM 1.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. A power supply for an avionics system, said avionics system having first and second electronic components with both said components being active when supplied with a first predetermined voltage and only said second electronic component being active when both said components are supplied with a second predetermined voltage that is lower in voltage level than said first predetermined voltage, comprising:

an input for receiving electrical power from an external source at predefined mains voltage;

a filter coupled to said input and having a pair of outputs; said filter for preventing transmission of harmonic signals and permitting passage of electrical power;

a first power supply channel having an input and an output, said input being coupled to a first of said pair of outputs of said filter for modifying said mains voltage to a first predetermined voltage level required for operation of said avionics system and supplying current to said output drawn through said filter from said external source;

a second power supply channel having an input and an output, said second power supply channel including: a rechargeable battery; a battery charger for charging said battery; and means for coupling said battery to said supply output to produce a second predetermined voltage at said supply output, said second predetermined voltage being less than said first predetermined voltage;

a semiconductor switch, said semiconductor switch normally coupling said output of said first channel to said power supply output for supplying power at said first predetermined voltage to an avionics system, and for coupling said output of said second channel to said power supply output when said first channel fails to supply power to said power supply output to supply power at a second predetermined voltage to said avionics system;

a microcontroller for monitoring the voltage at and current through said inputs of each of said first and second channels and the voltage and current outputs from each said channel and, when any of said voltages or currents departs from a predetermined range of normal values for said input and output voltages and currents, for producing an adjustment in the respective channel or channels to counteract said departure;

a capacitance, said capacitance being coupled to said output of said first channel for receiving current from said first channel to accumulate and store an electric charge and for maintaining said electrical charge when said first channel is supplying current to said output, said electrical charge being discharged over a short time interval when said first channel fails to supply current to said output;

said microcontroller being supplied with operating power from said first channel when said first channel is supplying current to said supply output;

said capacitance being coupled to said microcontroller for supplying said microcontroller with temporary operating power for a short time interval following any termination of current from said first channel to said supply output, said temporary operating power being derived from said electrical charge stored in said capacitance, whereby said microcontroller continues to function for a short time interval in the event of failure of said first channel or of said external source;

said capacitance further being coupled to said semiconductor switch for supplying said semiconductor switch continued power for a short time interval, said temporary operating power derived from said electrical charge stored in said capacitance, whereby said semiconductor switch remains in its normal condition for a short time interval following termination of current from said first channel to said supply output, and thereafter couples said second channel to said supply output.

2. The invention as defined in claim 1, wherein said first channel further comprises: a transformer; a regulator; an adjustable filter; and a control unit;

said transformer being coupled to said regulator for coupling voltage from said channel input of said first channel to said regulator of said first channel; said regulator being coupled to said adjustable filter of said first channel for stepping up said voltage supplied by said transformer and applying said stepped up voltage to said adjustable filter; and said filter being coupled to said first channel output for filtering said voltage supplied by said regulator and supplying said filtered voltage to said first channel output; and said control unit for selectively individually controlling a characteristic of each of said transformer, said output regulator and said output filter, responsive to commands inputted from said microcontroller.

3. The invention as defined in claim 2, wherein said second channel further comprises: an output regulator; an adjustable output filter; and a control unit;

said output regulator being coupled to said battery for stepping up said battery voltage and applying said stepped up battery voltage to said adjustable filter; and said adjustable filter being coupled to said second channel output for filtering said stepped up battery voltage and applying said filtered stepped up battery voltage to said second channel output; and said control unit for selectively individually controlling a characteristic of each of said battery charger, said output regulator of said second channel, and said adjustable output filter of said second channel, responsive to commands inputted from said microcontroller.

4. The invention as defined in claim 3, further comprising:

a first voltage sensor for detecting the average voltage level at said first channel input;

a first current sensor for detecting the average current level into said first channel input;

a second voltage sensor for detecting the average voltage level at said second channel input;

a second current sensor for detecting the average current level into said second channel input;

a third voltage sensor for detecting the average voltage level at said first channel output;

a third current sensor for detecting the average current level into said first channel output;

a fourth voltage sensor for detecting the average voltage level at said second channel output; and a fourth current sensor for detecting the average current level into said second channel output.

5. The invention as defined in claim 4, further comprising:

a multi-channel analog to digital converter, said converter having an input connected to each of said sensors for producing a multibit digital word at an output, said multi-bit digital word including a digital representation of the levels detected by each of said sensors.

6. The invention as defined in claim 5, wherein said microcontroller includes a memory and program means, said program means including:

means for checking level information provided by each of said sensors periodically and storing the information received in a memory;

adjustment means for commanding each of said control units to make an adjustment;

means for comparing the level information received in each check of a sensor with a predetermined standard value stored in a memory, and, if said comparison yields a difference from said standard value greater than a predetermined difference, providing said difference to said adjustment means; and if said comparison yields a difference less than said predetermined difference, initiating a subsequent comparison; and means for comparing the level information received in a subsequent check of a sensor with the level information received for said sensor in the previous check that is temporarily stored in memory, and if said level information with within said predetermined difference, replacing said level information for said sensor that was earlier stored in memory with said level information for said sensor.

7. A power module for an avionics system, said power module for down-converting electrical voltage distributed by the main generator of an aircraft to a lower voltage suitable for powering electronic circuits and maintaining electrical isolation between said electrical voltage and said lower voltage, comprising:

a housing, said housing being of a rectangular shape;

a battery; a electronic switch; and a multi-layer printed circuit board located inside said housing;

an electrical connector, said electrical connector having a front side and a back side; said front side having connector contacts extending therefrom and said back side containing electrical leads for connecting associated contacts in an electronic circuit; said electrical connector being supported in and closing an end of said housing with said front side and said contacts of said connector extending outwardly from said end of said housing;

said printed circuit board being wired to contacts of said connector and supported on the backside of said connector within said housing;

a tempest filter, said tempest filter having an input for receiving main voltage from said aircraft generator and providing first and second electrically isolated outputs, said input of said tempest filter being wired to a first contact of said connector;

a controlled power conversion circuit; said power conversion circuit including an input and an output, said input being connected to a first output of said filter and said output being wired to a second contact of said connector for connection to a first input of said electronic switch;

a controlled battery charger, said battery charger having an input connected to a second one of said outputs of said filter, said battery charger having an output coupled to said rechargeable battery for supplying charging current to said rechargeable battery;

a battery output regulator and a smoothing output filter, said battery output regulator having an input coupled to said battery and an output coupled to an input of said smoothing filter, said smoothing filter having an output wired to a third conductive pin of said connector for coupling to a second input of said electronic switch; said output regulator for regulating current supplied by said battery into said output filter;

a controller;

said controller having an input connected to said first output of said tempest filter for determining the presence of main voltage and an output connected to an input of said primary transformer and to a control input of said output regulator for monitoring and controlling the load voltage and current outputted from said regulator to predetermined respective levels when said main voltage is present;

said controller having a second input connected to said second output of said tempest filter for monitoring the presence of said main voltage and a second output connected to a control input of said battery charger and to a control input of said battery output regulator for monitoring and controlling the charging current outputted by said battery charger to said battery when said main voltage is present and for controlling the output voltage and current from said battery power regulator to a prescribed level when said main voltage is not present;

said electronic switch having a first conductive state for outputting current applied to said first input of said electronic switch by said first output filter and said capacitor; and a second conductive state for outputting current applied to said second input of said electronic switch by said second output filter, said electronic switch being normally in said first conductive state and being switched from said first conductive state to said second conductive state only when current through said electronic switch when in said first conductive state drops to the sustenance level of said electronic switch; and said controller having a fifth output for controlling the state of said electronic switch; and wherein said controlled power conversion circuit comprises further:

a transformer; a output regulator; an output filter; and a capacitor; and said transformer being coupled to an input of said output regulator, said output regulator having an output connected to said filter and said filter having an output connected to said capacitor.

* * * * *